(12) United States Patent
Elledge

(10) Patent No.: US 6,918,301 B2
(45) Date of Patent: Jul. 19, 2005

(54) METHODS AND SYSTEMS TO DETECT DEFECTS IN AN END EFFECTOR FOR CONDITIONING POLISHING PADS USED IN POLISHING MICRO-DEVICE WORKPIECES

(75) Inventor: Jason B. Elledge, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 106 days.

(21) Appl. No.: 10/293,715

(22) Filed: Nov. 12, 2002

(65) Prior Publication Data

US 2004/0089070 A1 May 13, 2004

(51) Int. Cl.[7] ............................................. G01N 29/12
(52) U.S. Cl. ........................... 73/579; 451/56; 451/287; 438/14; 134/10
(58) Field of Search ......................... 73/579, 602, 659; 451/56, 72, 285, 287, 8; 438/14; 134/10

(56) References Cited

U.S. PATENT DOCUMENTS

| | | | |
|---|---|---|---|
| 3,741,334 A | * 6/1973 | Kaule | 73/630 |
| 5,399,234 A | * 3/1995 | Yu et al. | 438/14 |
| 5,531,861 A | * 7/1996 | Yu et al. | 438/693 |
| 5,616,069 A | 4/1997 | Walker et al. | 451/56 |
| 5,645,682 A | 7/1997 | Skrovan | 156/636.1 |
| 5,655,951 A | 8/1997 | Meikle et al. | 451/56 |
| 5,683,289 A | * 11/1997 | Hempel, Jr. | 451/56 |
| 5,725,417 A | 3/1998 | Robinson | 451/56 |
| 5,779,522 A | 7/1998 | Walker et al. | 451/56 |
| 5,782,675 A | 7/1998 | Southwick | 451/56 |
| 5,801,066 A | 9/1998 | Meikle | 438/14 |
| 5,833,519 A | 11/1998 | Moore | 451/56 |
| 5,846,336 A | 12/1998 | Skrovan | 134/10 |
| 5,879,226 A | 3/1999 | Robinson | 451/287 |
| 5,910,043 A | 6/1999 | Manzonie et al. | 451/285 |
| 5,930,699 A | 7/1999 | Bhatia | 455/414 |
| 5,975,994 A | 11/1999 | Sandhu et al. | 451/56 |
| 6,004,196 A | 12/1999 | Doan et al. | 451/443 |

(Continued)

OTHER PUBLICATIONS

Bhardwaj, Mahesh C., "High transduction Piezoelectric transducers and introduction of Non–Contact analysis," 19 pages, http://www.ndt.net/article/v05n01/bhardwaj/bhardwaj.htm (accessed Jun. 13, 2002), NDT.net, vol. 5, No. 01, Jan. 2000, NDT.net, Rolf Diederichs, Kirchwald, Germany.
Browne, Bill, "Time of Flight Diffraction. Its Limitations—Actual & Perceived," 15 pages, http://www.ndt.net/article/tofd/browne/browne.htm (accessed Jun. 13, 2002), NDT.net, vol. 2 No. 09. Sep. 1997, NDT.net, Rolf Diederichs, Kirchwald, Germany.

(Continued)

*Primary Examiner*—Hezron Williams
*Assistant Examiner*—Rose M. Miller
(74) *Attorney, Agent, or Firm*—Perkins Coie LLP

(57) ABSTRACT

Methods and systems to detect defects in an end effector for conditioning polishing pads used in polishing micro-device workpieces are disclosed herein. In one embodiment, a method of detecting defects in an end effector includes applying energy to a contact element of the end effector and determining a natural frequency of the contact element. Applying energy can include transmitting ultrasonic energy from a transducer to the contact element. The method can further include comparing the natural frequency of the contact element to a predetermined frequency limit to detect a defect. In another embodiment, a system to detect defects includes a conditioner having an end effector with a contact element, a transducer for applying energy to the contact element, and a controller operatively coupled to the conditioner and the transducer. The controller has a computer-readable medium containing instructions to perform the above-mentioned method.

73 Claims, 4 Drawing Sheets

U.S. PATENT DOCUMENTS

| | | | | |
|---|---|---|---|---|
| 6,083,085 | A | | 7/2000 | Lankford .................... 451/56 |
| 6,120,349 | A | * | 9/2000 | Nyui et al. .................... 451/21 |
| 6,196,899 | B1 | | 3/2001 | Chopra et al. ................ 451/56 |
| 6,203,413 | B1 | | 3/2001 | Skrovan ...................... 451/72 |
| 6,220,934 | B1 | | 4/2001 | Sharples et al. .............. 451/36 |
| 6,238,270 | B1 | | 5/2001 | Robinson .................... 451/41 |
| 6,241,587 | B1 | * | 6/2001 | Drill et al. .................... 451/56 |
| 6,273,800 | B1 | | 8/2001 | Walker et al. .............. 451/168 |
| 6,284,660 | B1 | | 9/2001 | Doan ........................ 438/692 |
| 6,306,008 | B1 | | 10/2001 | Moore .......................... 451/5 |
| 6,331,139 | B2 | | 12/2001 | Walker et al. .............. 451/490 |
| 6,350,691 | B1 | | 2/2002 | Lankford .................... 438/692 |
| 6,352,470 | B2 | | 3/2002 | Elledge ...................... 451/285 |
| 6,354,923 | B1 | | 3/2002 | Lankford .................... 451/72 |
| 6,361,411 | B1 | | 3/2002 | Chopra et al. ................ 451/56 |
| 6,361,413 | B1 | | 3/2002 | Skrovan ...................... 451/56 |
| 6,368,197 | B2 | | 4/2002 | Elledge ...................... 451/296 |
| 6,634,924 | B1 | * | 10/2003 | Ono et al. ...................... 451/5 |
| 6,666,749 | B2 | * | 12/2003 | Taylor .......................... 451/6 |
| 2002/0127950 | A1 | * | 9/2002 | Hirose et al. .................. 451/6 |
| 2003/0092270 | A1 | * | 5/2003 | Chu et al. .................... 438/692 |

OTHER PUBLICATIONS

Chen, C.H. and Cheng, Tzu–Hung, abstract of "Time–Frequency Analysis in Ultrasonic Nondestructive Testing," 1 page, http://www.ndt.net/abstract/wcndt96/data2/271.htm (accessed Jun. 13, 2002), NDT.net, Rolf Diederichs, Kirchwald, Germany. Article published in Trends in NDE Science & Technology; Proceedings of the 14th World Conference on Non–Destructive Testing, New Delhi, Dec. 8–13, 1996, Ashgate Publishing Company.

Eriksson, A.S. et al., abstract of "Modelling of Ultrasonic Crack Detection in Austenitic Welds," 1 page, http://www.ndt.net/abstract/ecndt98/379.htm (accessed Jun. 13, 2002),NDT.net, vol. 3, No. 8, Aug. 1998, NDT.net, Rolf Diederichs, Kirchwald, Germany. Article published in Proceedings of the 7th European Conference on Non–Destructive Testing, Copenhagen, May 26–29, 1998.

Ginzel, Ed, "Ultrasonic Inspection 2. Training For Nondestructive Testing—Variables Affecting Test Results," 18 pages, http://www.ndt.net/article/v04n06/gin_ut2/gin_ut2.htm (accessed Jun. 13, 2002), NDT.net, vol. 4, No. 6, Jun. 1999, NDT.net, Rolf Diederichs, Kirchwald, Germany.

* cited by examiner

METHODS AND SYSTEMS TO DETECT DEFECTS IN AN END EFFECTOR FOR CONDITIONING POLISHING PADS USED IN POLISHING MICRO-DEVICE WORKPIECES

TECHNICAL FIELD

The present invention relates to methods and systems to detect defects in an end effector for conditioning polishing pads used in polishing micro-device workpieces.

BACKGROUND

Mechanical and chemical-mechanical planarization processes (collectively "CMP") remove material from the surface of micro-device workpieces in the production of microelectronic devices and other products. FIG. 1 schematically illustrates a rotary CMP machine 10 with a platen 20, a carrier head 30, and a planarizing pad 40. The CMP machine 10 may also have an under-pad 25 between an upper surface 22 of the platen 20 and a lower surface of the planarizing pad 40. A drive assembly 26 rotates the platen 20 (indicated by arrow F) and/or reciprocates the platen 20 back and forth (indicated by arrow G). Since the planarizing pad 40 is attached to the under-pad 25, the planarizing pad 40 moves with the platen 20 during planarization.

The carrier head 30 has a lower surface 32 to which a micro-device workpiece 12 may be attached, or the workpiece 12 may be attached to a resilient pad 34 under the lower surface 32. The carrier head 30 may be a weighted, free-floating wafer carrier, or an actuator assembly 36 may be attached to the carrier head 30 to impart rotational motion to the micro-device workpiece 12 (indicated by arrow J) and/or reciprocate the workpiece 12 back and forth (indicated by arrow I).

The planarizing pad 40 and a planarizing solution 44 define a planarizing medium that mechanically and/or chemically-mechanically removes material from the surface of the micro-device workpiece 12. The planarizing solution 44 may be a conventional CMP slurry with abrasive particles and chemicals that etch and/or oxidize the surface of the micro-device workpiece 12, or the planarizing solution 44 may be a "clean" nonabrasive planarizing solution without abrasive particles. In most CMP applications, abrasive slurries with abrasive particles are used on nonabrasive polishing pads, and clean nonabrasive solutions without abrasive particles are used on fixed-abrasive polishing pads.

To planarize the micro-device workpiece 12 with the CMP machine 10, the carrier head 30 presses the workpiece 12 face-down against the planarizing pad 40. More specifically, the carrier head 30 generally presses the micro-device workpiece 12 against the planarizing solution 44 on a planarizing surface 42 of the planarizing pad 40, and the platen 20 and/or the carrier head 30 moves to rub the workpiece 12 against the planarizing surface 42. As the micro-device workpiece 12 rubs against the planarizing surface 42, the planarizing medium removes material from the face of the workpiece 12.

The CMP process must consistently and accurately produce a uniformly planar surface on the micro-device workpiece 12 to enable precise fabrication of circuits and photopatterns. One problem with conventional CMP methods is that the planarizing surface 42 of the planarizing pad 40 can wear unevenly causing the pad to have a non-planar planarizing surface 42. Another concern is that the surface texture of the planarizing pad 40 may change non-uniformly over time. Still another problem with CMP processing is that the planarizing surface 42 can become glazed with accumulations of planarizing solution 44, material removed from the micro-device workpiece 12, and/or material removed from the planarizing pad 40. To restore the planarizing characteristics of the planarizing pad 40, the pad 40 is typically conditioned by re-forming a planar surface and removing the accumulations of waste matter with a conditioner 50. The conventional conditioner 50 includes an abrasive end effector 51 generally embedded with diamond particles and a separate actuator 55 coupled to the end effector 51 to move it rotationally, laterally, and/or axially, as indicated by arrows A, B, and C, respectively. The typical end effector 51 removes a thin layer of the planarizing pad material in addition to the waste matter to form a more planar, clean planarizing surface 42 on the planarizing pad 40.

One drawback of conventional end effectors and conventional methods for conditioning planarizing pads is that the embedded diamond particles can break apart or fall off the end effector during conditioning. For example, some diamond particles have significant defects (e.g., cracks, flaws) in their crystalline structure, resulting in a portion of the particle breaking off when a load is applied. Diamond particles also fall off as the material bonding the particles to the end effector wears away. Loose diamond particles can become trapped in grooves in the planarizing pad and consequently cause defects in a micro-device workpiece during planarizing.

SUMMARY

The present invention is directed to methods and systems to detect defects in an end effector for conditioning polishing pads used in polishing micro-device workpieces. In one embodiment, a method of detecting defects in an end effector includes applying energy to a discrete area of the end effector and determining a natural frequency of the end effector at the discrete area. In one aspect of this embodiment, applying energy to the discrete area includes transmitting ultrasonic energy from a transducer to the discrete area of the end effector. In another aspect of this embodiment, the method further includes comparing the natural frequency of the discrete area of the end effector to a predetermined frequency limit to detect a defect. In yet another aspect of this embodiment, applying energy to the discrete area includes applying energy with a first frequency to the discrete area and applying energy with a second frequency different from the first frequency to the discrete area to determine the natural frequency of the end effector at the discrete area.

In another embodiment of the invention, a method of detecting defects in the end effector includes resonating a contact element of the end effector at a natural frequency and comparing the natural frequency of the contact element to a frequency limit for known good contact elements to detect whether the end effector contains a defect. In one aspect of this embodiment, resonating the contact element includes applying ultrasonic energy to the contact element from a transducer. In another aspect of this embodiment, the end effector is a production end effector and the method further includes determining a range of frequencies that corresponds to the natural frequencies of contact elements of a test end effector. The contact elements of the test end effector do not have significant defects, and the range of frequencies includes the frequency limit. In this aspect of the embodiment, comparing the natural frequency of the contact element of the production end effector includes determining if the contact element of the production end effector has a significant defect and/or if the contact element is securely attached to the production end effector.

In another embodiment of the invention, a system for detecting defects in an end effector includes a conditioner having an end effector with at least one contact element, a transducer for applying energy to the contact element, and a controller operatively coupled to the conditioner and the transducer. The controller has a computer-readable medium containing instructions to perform at least one of the above-mentioned methods. In one aspect of this embodiment, the transducer is configured to transmit ultrasonic energy at a plurality of frequencies to the contact element. The transducer can be movable over the contact element or can be carried by the end effector.

DETAILED DESCRIPTION

The present invention is directed to methods and systems to detect defects in an end effector for conditioning polishing pads used in polishing micro-device workpieces or otherwise monitor the status of the end effector. The term "microdevice workpiece" is used throughout to include substrates in and/or on which micro-mechanical devices, data storage elements and other features are fabricated. For example, micro-device workpieces can be semiconductor wafers, glass substrates, insulated substrates, or many other types of substrates. Furthermore, the terms "planarizing" and "planarization" mean either forming a planar surface and/or forming a smooth surface (e.g., "polishing"). Several specific details of the invention are set forth in the following description and in FIGS. 2–6 to provide a thorough understanding of certain embodiments of the invention. One skilled in the art, however, will understand that the present invention may have additional embodiments, or that other embodiments of the invention may be practiced without several of the specific features explained in the following description.

Figure 1:
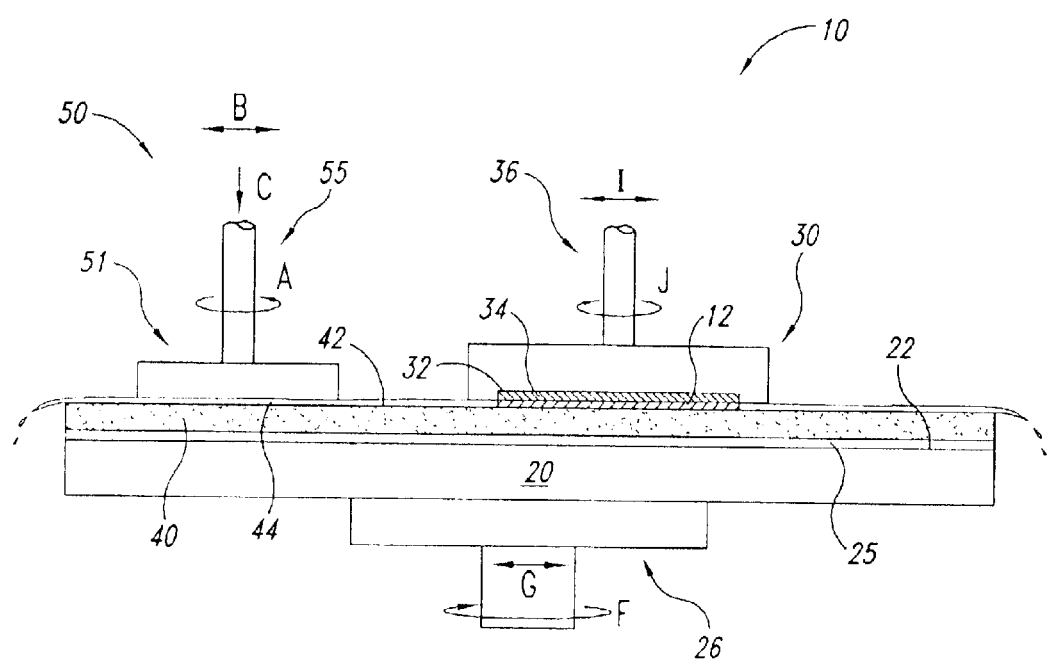
FIG. 1 is a schematic cross-sectional view of a portion of a rotary planarizing machine and an abrasive end effector in accordance with the prior art.
Figure 2:
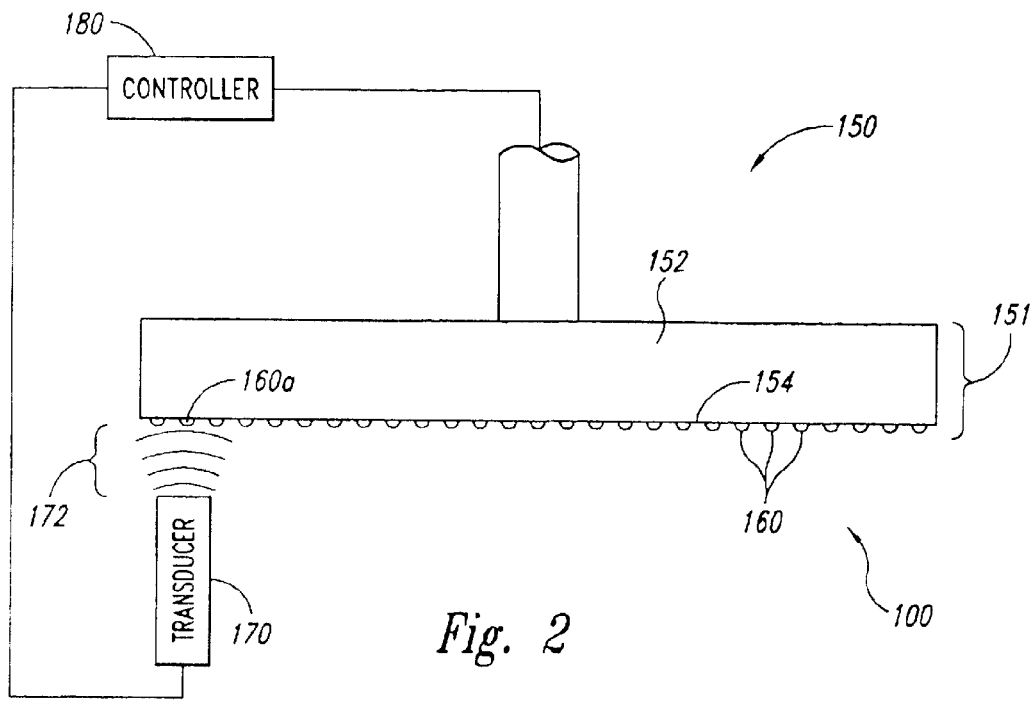
FIG. 2 is a schematic view of a system for detecting defects in an end effector in accordance with one embodiment of the invention.

FIG. 2 schematically illustrates a system 100 for monitoring the status of an end effector used for conditioning polishing pads in accordance with one embodiment of the invention. The system 100 can include a conditioner 150, a transducer 170, and a controller 180 operatively coupled to the conditioner 150 and the transducer 170. The conditioner 150 is configured to be coupled to a CMP machine, such as the CMP machine 10 discussed above with reference to FIG. 1. The conditioner 150 includes an end effector 151 to refurbish a planarizing pad on the CMP machine to bring the planarizing surface of the pad to a desired state for consistent performance.

In the illustrated embodiment, the end effector 151 includes a plate 152 and a plurality of contact elements 160 projecting from the plate 152. The plate 152 can be a circular member having a contact surface 154 configured to contact the planarizing surface of the planarizing pad. The contact surface can be a generally flat surface. In one aspect of this embodiment, the plate 152 can be made of a noncorrosive material, such as stainless steel, to resist the corrosive effects of a planarizing solution. In other aspects of this embodiment, other noncorrosive materials such as glass, composite, or ceramic can be used to form the plate 152.

The contact elements 160 can be integral portions of the plate 152 or discrete elements coupled to the plate 152. In the illustrated embodiment, the contact elements 160 are small diamonds attached to the contact surface 154 of the plate 152. Many of the contact elements 160 of the end effector 151 have internal cracks or other types of defects. Some of these defects are significant and can cause the contact elements 160 to fail when the contact elements 160 are subjected to loads. For example, a first contact element 160a of the end effector 151 has a significant internal defect that can cause a portion of the element 160a to break off while conditioning a planarizing pad.

Figure 3:
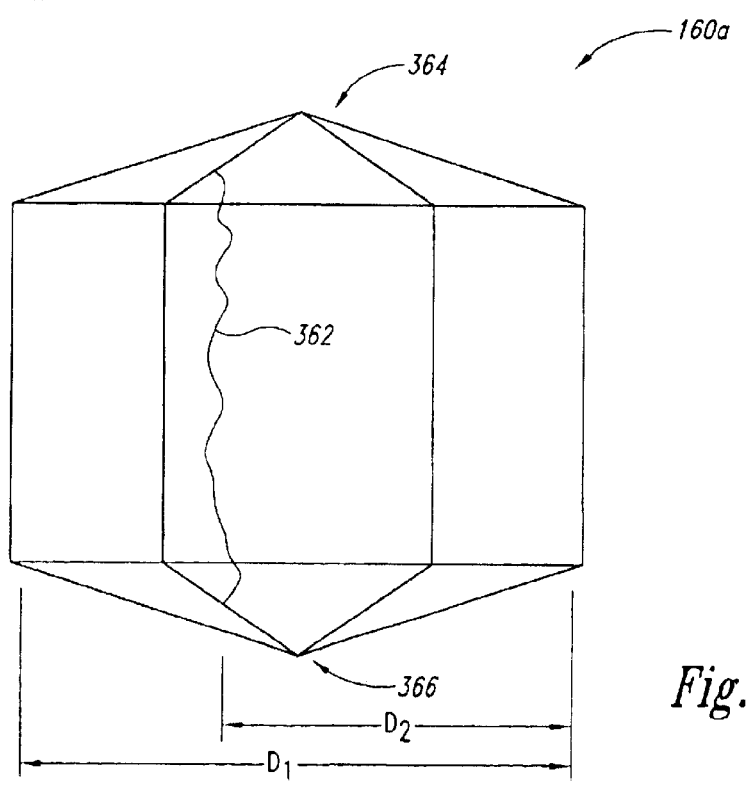
FIG. 3 is a side view of a first contact element of the end effector of FIG. 2.

FIG. 3 is a side view of the first contact element 160a detached from the end effector 151. In the illustrated embodiment, the first contact element 160a has a generally hexagonal shape with an actual mean diameter $D_1$. In one aspect of this embodiment, the actual mean diameter $D_1$ can be between approximately 45 microns and approximately 300 microns. The first contact element 160a also has a first surface 364 (which is attached to the contact surface 154 of the end effector 151 illustrated in FIG. 2), a second surface 366 opposite the first surface 364, and a crack 362 extending from the first surface 364 to the second surface 366. The crack 362 extends through the first contact element 160a and accordingly creates an effective diameter $D_2$ in the element 160a that is smaller than the actual mean diameter $D_1$. In other embodiments, the first contact element 160a and some or all of the other contact elements 160 can have multiple defects, and each defect can have a different configuration and/or size. Furthermore, the first contact element 160a and any of the other contact elements 160 can have a different shape and/or size.

Referring to FIGS. 2 and 3, the end effector 151 can have defects besides cracks in the contact elements 160. For example, the end effector 151 can include contact elements that are not attached securely to the plate 152 because of a manufacturing flaw or because the bonding material has partially worn away. When the contact elements 160 are not bonded sufficiently to the plate 152, an entire contact element can detach from the end effector 151 during conditioning. Such detached contact elements can produce significant defects on the workpiece.

One embodiment of the invention involves detecting defective contact elements or other defects of the end effector 151 before a failure occurs. For example, defects in the end effector 151 can be identified by determining the natural frequency of each contact element 160 and comparing the natural frequency of each contact element 160 to a predetermined frequency limit or range of frequencies. Contact elements with at least one significant internal defect, such as the crack 362 in the first contact element 160a, have higher natural frequencies because they have smaller effective diameters than other contact elements that do not have significant defects. For example, in the illustrated embodiment, assuming that the actual mean diameter $D_1$ of the first contact element 160a is approximately 100 microns, the effective diameter $D_2$ due to the crack 362 would be approximately 60 microns. Accordingly, the crack 362 significantly decreases the size of the contact element 160a to two particles, which increases the natural frequency of the first contact element 160a.

After the natural frequency of each contact element 160 is determined, the natural frequencies are compared to a predetermined frequency limit or range of frequencies to detect defects in the end effector 151. The predetermined frequency limit or range of frequencies can be ascertained by determining the natural frequencies of contact elements on a test end effector that is at least similar to the end effector 151. The contact elements on the test end effector are also at least similar in shape and size to the contact elements 160. The contact elements of the test end effector, however, do not contain significant defects. As will be discussed in greater detail below regarding FIGS. 4A and 4B, a contact element 160 has a defect if its natural frequency falls outside the predetermined range of frequencies for good particles.

In another embodiment, the natural frequency of each contact element 160 of the end effector 151 can be compared to the natural frequency of other contact elements 160 of the end effector 151 to detect defects. For example, if the majority of contact elements 160 have natural frequencies that fall within a certain range, contact elements 160 with natural frequencies outside the range may have significant defects.

In the illustrated embodiment, the transducer 170 moves across the end effector 151 to determine the natural frequencies of the contact elements 160. In one aspect of this embodiment, the transducer 170 can direct energy, such as ultrasonic waves 172, toward the contact elements 160 to induce each contact element 160 to resonate at its natural frequency. For example, the transducer 170 can direct ultrasonic waves 172 at a first frequency toward the first contact element 160a. If the first frequency corresponds to the natural frequency of the first contact element 160a, the ultrasonic waves 172 will cause the first contact element 160a to resonate. The transducer 170 can detect if the first contact element 160a resonates based on the reflection of the ultrasonic waves 172. More specifically, when the ultrasonic waves 172 are directed toward the first contact element 160a, a first portion of the ultrasonic waves 172 reflects off the second surface 366 of the first contact element 160a and returns to the transducer 170. A second portion of the ultrasonic waves 172 travels through the first contact element 160a and is reflected back to the transducer 170 by the contact surface 154 of the plate 152. If the first frequency is the natural frequency of the first contact element 160a, the first and second portions of the ultrasonic waves 172 will constructively interfere with each other as they return to the transducer 170. The transducer 170 can detect the constructive interference between the first and second portions of the ultrasonic waves 172 due to either a phase shift in the frequency or an increase in the amplitude of the reflected ultrasonic waves 172.

In addition to directing ultrasonic waves 172 at a first frequency, the transducer 170 can transmit ultrasonic waves 172 at various other discrete frequencies to determine the natural frequency of each contact element 160. In one aspect of this embodiment, the transducer 170 directs ultrasonic waves 172 toward the contact elements 160 at various discrete frequencies within a range of frequencies, such as within the 5 kHz to 150 MHz range. In other embodiments, the transducer 170 can direct ultrasonic waves 172 at other frequencies or ranges of frequencies, such as frequencies greater than 150 MHz or less than 5 kHz. In additional embodiments, the transducer 170 can direct other types of energy, such as light, toward the contact elements 160.

In the illustrated embodiment, the transducer 170 uses a noncontact method to transmit the ultrasonic waves 172 to the end effector 151. Suitable noncontact ultrasonic systems are manufactured by SecondWave Systems of Boalsburg, Pa. In additional embodiments, as described below with reference to FIG. 5, transducer 170 may not use a noncontact method to transmit the ultrasonic waves 172 to the end effector 151.

In one embodiment, the transducer 170 can determine the natural frequencies of the contact elements 160 before, after, or during conditioning. For example, the natural frequencies can be determined in situ on the CMP machine or after the conditioner 150 has been removed from the machine. In one aspect of this embodiment, the transducer 170 can have a diameter between approximately 3 mm and 50 mm. In additional embodiments, the transducer 170 can have a diameter smaller than 3 mm or greater than 50 mm.

Figure 4A:
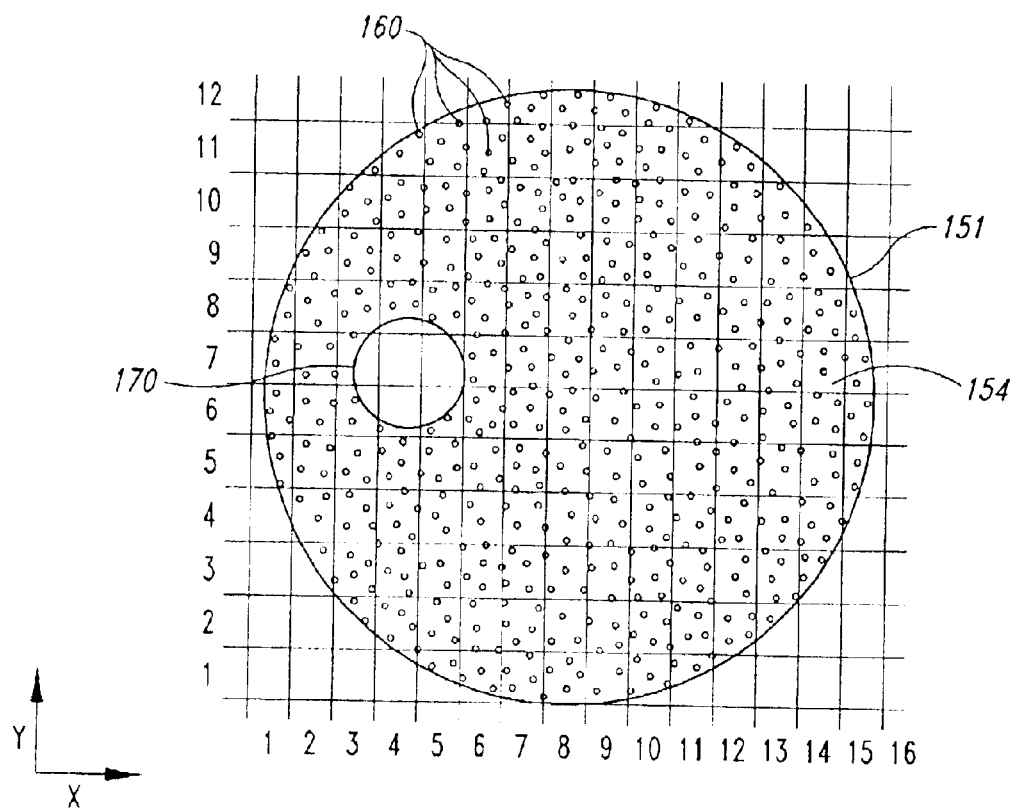
FIG. 4A is a schematic bottom view of the end effector of FIG. 2 with a grid superimposed on the lower surface.

FIG. 4A is a schematic bottom view of the end effector 151 with a grid having an X axis and a Y axis superimposed on the contact surface 154. In one aspect of the illustrated embodiment, the transducer 170 determines the natural frequencies of the contact elements 160 by moving parallel to the X axis across a first area of the contact surface 154 and then back the other direction across a second area contiguous to the first area. The transducer 170 continues sweeping paths parallel to the X axis until the transducer 170 has determined the natural frequency of each contact element 160. In other embodiments, the transducer 170 may move across the end effector 151 in different directions.

Figure 4B:
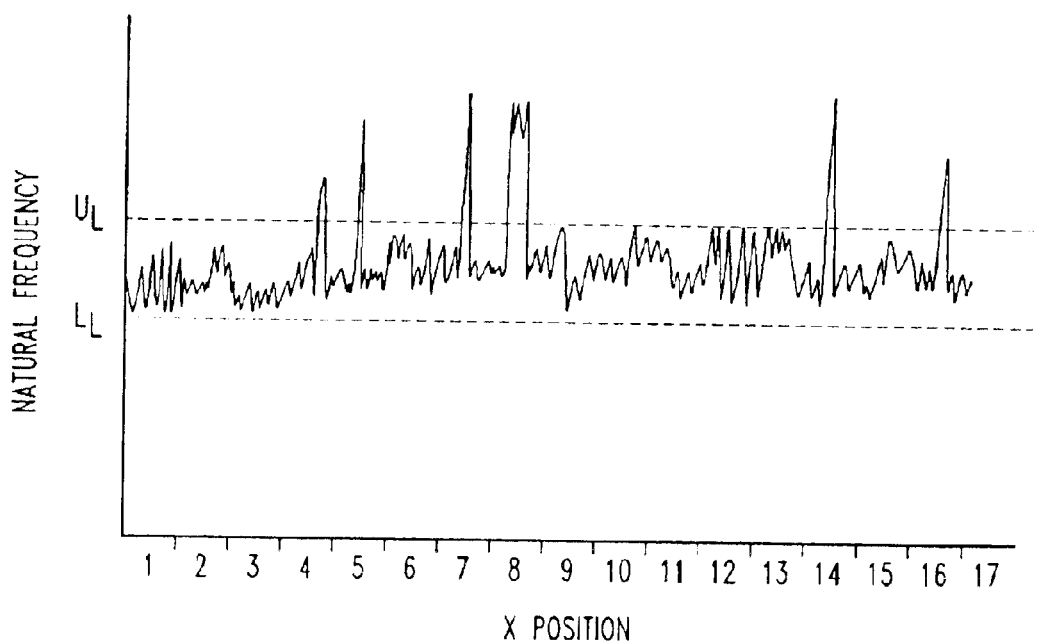
FIG. 4B is a graph illustrating the natural frequencies of the contact elements of the end effector of FIG. 2.

FIG. 4B illustrates a graph of the natural frequencies of the contact elements 160 between positions X-1, Y-7 and X-16, Y-7 on the grid illustrated in FIG. 4A. The graph also contains an upper limit $U_L$ and a lower limit $L_L$ that were determined based on the natural frequencies of the contact elements of the test end effector. Referring to FIGS. 4A and 4B, the upper limit $U_L$ represents the frequency at which a contact element is likely to contain a significant defect. Accordingly, the natural frequencies on the graph that exceed the upper limit $U_L$ represent contact elements 160 that may have significant defects. The position of each contact element having a significant defect can be ascertained by using the grid (illustrated in FIG. 4A) and the graph (illustrated in FIG. 4B) together. For example, one of the contact elements at position X-4, Y-7 has a significant defect.

In one aspect of the illustrated embodiment, a three-dimensional model can be created as the transducer 170 determines the natural frequencies of the contact elements 160 across the end effector 151. Such a three-dimensional model would permit a quick and easy visual inspection of the position and number of contact elements that are likely to have significant defects.

One advantage of the system 100 of the illustrated embodiment is that the contact elements having significant defects can be detected and removed before the elements fail during conditioning. If a contact element fails during conditioning, broken particles of the element may remain on the planarizing pad and scratch micro-device workpieces during planarizing. Accordingly, the system 100 can test the end effector 151 before conditioning a pad to detect manufacturing defects and damage sustained during conditioning. Furthermore, the remaining life of the end effector can be predicted by tracking the natural frequencies of the contact elements 160 on the conditioner 150. For example, as the contact elements 160 and the material bonding the contact elements 160 to the plate 152 wear, the natural frequencies of the contact elements 160 change. These changes can be associated with an expected remaining useful life of the end effector 151.

Figure 5:
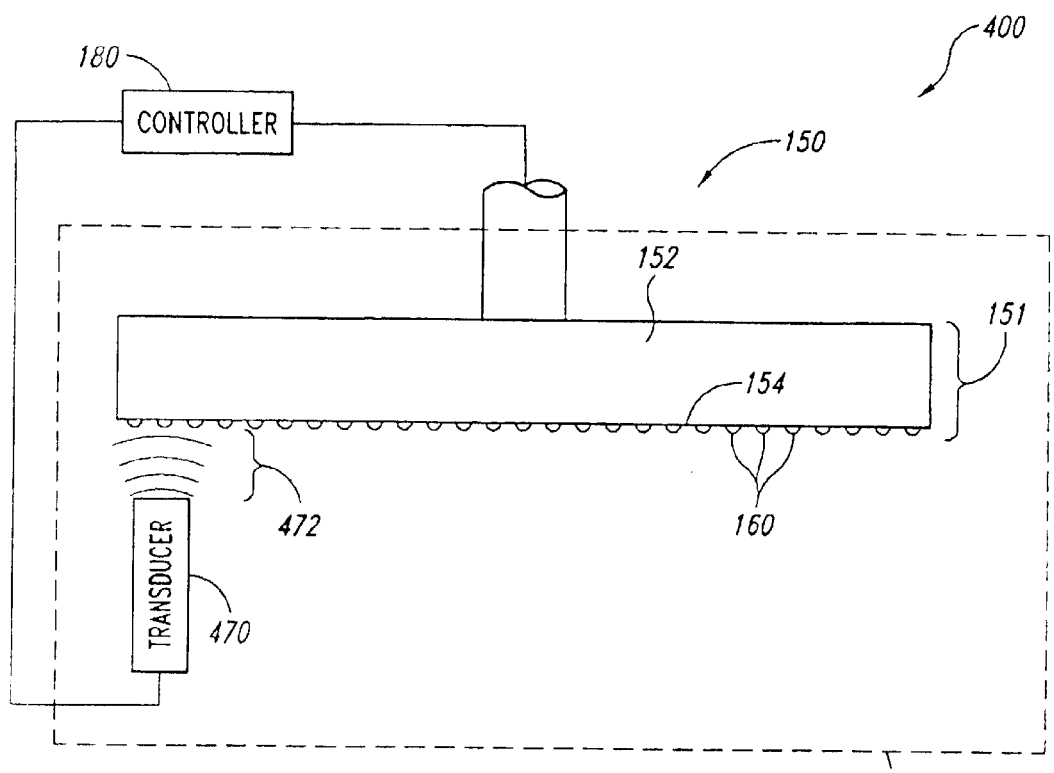
FIG. 5 is a schematic view of a system for detecting defects in the end effector in accordance with another embodiment of the invention.

FIG. 5 schematically illustrates a system 400 for detecting defects in the end effector 151 in accordance with another embodiment of the invention. The system 400 includes a conditioner 150, a controller 180, and a transducer 470 operatively coupled to the controller 180 and movable across the end effector 151 of the conditioner 150. The transducer 470 detects defects in the contact elements 160 by transmitting energy, such as ultrasonic waves 472, toward the contact elements 160 and monitoring the reflections of the ultrasonic waves 472. For example, in one aspect of the invention, the transducer 470 transmits ultrasonic waves 472 that pass through the contact elements 160 and are reflected back to the transducer 470 by the contact surface 154 of the plate 152. When a contact element 160 includes a defect, the defect reflects a portion of the ultrasonic waves 472 back to the transducer 470 as echoes. The defect is detected because the echoes return to the transducer 470 prior to the other portion of the ultrasonic waves 472.

The system 400 of the illustrated embodiment also includes a bath 490 (illustrated by dash lines). The bath 490 can contain a liquid, such as water, which acts as a medium to transmit the ultrasonic waves 472 from the transducer 470 to the contact elements 160. In other embodiments, the system 400 may not include a bath 490 but may be a noncontact system, such as the system 100 described above with reference to FIGS. 2–4B.

Figure 6:
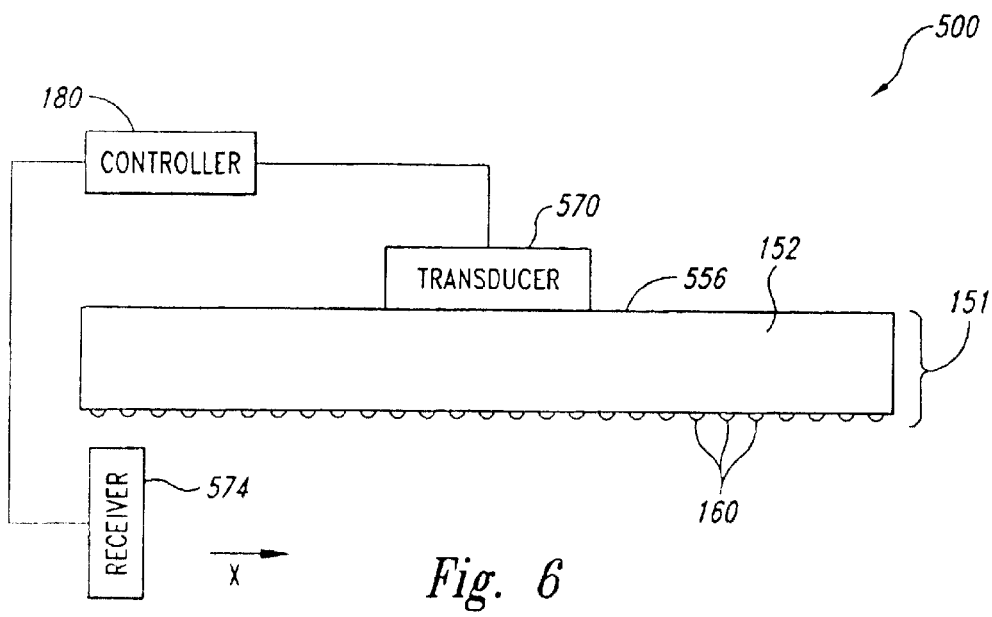
FIG. 6 is a schematic view of a system including a transducer and a receiver for detecting defects in the end effector in accordance with another embodiment of the invention.

FIG. 6 is a schematic view of a system 500 including a transducer 570 and a receiver 574 for detecting defects in the end effector 151 in accordance with another embodiment of the invention. The transducer 570 can be a mechanical, vibrating transducer, such as a piezoelectronic transducer, positioned at least proximate to an upper surface 556 of the plate 152 to vibrate the end effector 151. The transducer 570, accordingly, vibrates the contact elements 160 of the end effector 151 at various frequencies to induce resonance. The receiver 574 moves in a direction X along the end effector 151 to detect which contact elements 160 are resonating at a specific frequency. Accordingly, the natural frequency of each contact element 160 can be determined and compared with the predetermined limits to detect a significant defect.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of detecting defects in an end effector for conditioning polishing pads used for polishing micro-device workpieces, comprising:

applying energy to a discrete area of the end effector; and determining a natural frequency of the end effector at the discrete area.

2. The method of claim 1, further comprising comparing the natural frequency of the end effector at the discrete area to a predetermined frequency limit to detect whether the end effector contains a defect.

3. The method of claim 1, further comprising moving a transducer over the end effector, wherein applying energy comprises transmitting ultrasonic energy from the transducer to the discrete area of the end effector.

4. The method of claim 1 wherein applying energy comprises transmitting energy with a first frequency between approximately 5 kHz and approximately 150 MHz to the discrete area of the end effector to determine the natural frequency.

5. The method of claim 1 wherein applying energy comprises:

applying energy with a first frequency to the discrete area of the end effector; and applying energy with a second frequency different from the first frequency to the discrete area of the end effector to determine the natural frequency.

6. The method of claim 1 wherein determining the natural frequency comprises resonating the end effector at the discrete area at the natural frequency by applying energy to the discrete area of the end effector at the natural frequency.

7. The method of claim 1 wherein applying energy comprises transmitting ultrasonic energy to the discrete area of the end effector through a liquid from a transducer movable over the end effector.

8. The method of claim 1 wherein applying energy comprises transmitting ultrasonic energy to the discrete area of the end effector from a transducer carried by the end effector.

9. The method of claim 1 wherein the end effector is a production end effector, and wherein the method further comprises:

determining a range of frequencies corresponding to the natural frequencies of discrete areas of a test end effector, wherein the discrete areas of the test end effector do not have significant defects; and comparing the natural frequency of the discrete area of the production end effector to the range of frequencies to determine if a contact element in the discrete area of the production end effector includes a significant defect.

10. The method of claim 1 wherein the end effector is a production end effector, and wherein the method further comprises:

determining a range of frequencies corresponding to the natural frequencies of discrete areas of a test end effector, wherein the discrete areas of the test end effector do not have significant defects; and comparing the natural frequency of the discrete area of the production end effector to the range of frequencies to determine if a contact element in the discrete area of the production end effector is securely attached to the end effector.

11. The method of claim 1, further comprising moving a transducer over the end effector, wherein applying energy comprises applying ultrasonic energy at a plurality of frequencies when the transducer is proximate to the discrete area of the end effector.

12. A method of detecting defects in an end effector for conditioning polishing pads, comprising:

resonating a contact element of the end effector at a natural frequency; and comparing the natural frequency of the contact element to a frequency limit for known good contact elements to detect whether the end effector contains a defect.

13. The method of claim 12 wherein resonating the contact element comprises applying ultrasonic energy to the contact element from a transducer.

14. The method of claim 12 wherein resonating the contact element comprises applying energy with a first frequency between approximately 5 kHz and approximately 150 MHz to the contact element, and wherein the first frequency is at least approximately the same as the natural frequency.

15. The method of claim 12 wherein resonating the contact element comprises vibrating the end effector with a transducer carried by the end etfector at a first frequency at least approximately the same as the natural frequency.

16. The method of claim 12, further comprising determining the natural frequency of the contact element, wherein determining the natural frequency of the contact element comprises transmitting energy at a plurality of frequencies to cause the contact element to resonate.

17. The method of claim 12 wherein the end effector is a production end effector, and wherein the method further comprises:
   determining a range of frequencies that corresponds to the natural frequencies of the known good contact elements of a test end effector, wherein the range of frequencies includes the frequency limit, and wherein the known good contact elements of the test end effector do not have significant defects.

18. The method of claim 12 wherein the end effector is a production end effector, and wherein the method further comprises:
   determining a range of frequencies that corresponds to the natural frequencies of the known good contact elements of a test end effector, wherein the range of frequencies includes the frequency limit, and wherein the known good contact elements of the test end effector do not have significant defects;
   wherein comparing the natural frequency of the contact element of the production end effector comprises determining if the contact element of the production end effector has a significant defect.

19. The method of claim 12 wherein the end effector is a production end effector, and wherein the method further comprises:
   determining a range of frequencies that corresponds to the natural frequencies of the known good contact elements of a test end effector, wherein the range of frequencies includes the frequency limit, and wherein the known good contact elements of the test end effector do not have significant defects;
   wherein comparing the natural frequency of the contact element of the production end effector comprises determining if the contact element is securely attached to the production end effector.

20. A method of detecting defects in an end effector for conditioning polishing pads, comprising:
   positioning a transducer at least proximate to at least one contact element of the end effector to detect a defect in the end effector;
   applying energy at a first frequency to the at least one contact element from the transducer; and
   applying energy at a second frequency different from the first frequency to the at least one contact element from the transducer.

21. The method of claim 20, further comprising determining the natural frequency of the at least one end effector.

22. The method of claim 20 wherein applying energy at a first frequency comprises transmitting ultrasonic energy to the at least one contact element from the transducer and through a gas medium.

23. The method of claim 20 wherein applying energy at a first frequency comprises transmitting ultrasonic energy to the at least one contact element from the transducer and through a liquid medium.

24. The method of claim 20 wherein the at least one contact element comprises a plurality of contact elements, and wherein the method further comprises determining the natural frequency of each contact element in the plurality of contact elements.

25. The method of claim 20 wherein the end effector is a production end effector, and wherein the method further comprises:
   determining the natural frequency of the at least one contact element;
   determining a range of frequencies corresponding to the natural frequencies of contact elements of a test end effector, wherein the contact elements of the test end effector do not have significant defects; and
   comparing the natural frequency of the at least one contact element of the production end effector to the range of frequencies to determine if the at least one contact element includes a significant defect.

26. The method of claim 20 wherein the end effector is a production end effector, and wherein the method further comprises:
   determining the natural frequency of the at least one contact element;
   determining a range of frequencies corresponding to the natural frequencies of contact elements of a test end effector, wherein the contact elements of the test end effector do not have significant defects; and
   comparing the natural frequency of the at least one contact element of the production end effector to the range of frequencies to determine if the at least one contact element is securely attached to the production end effector.

27. A method of testing for significant defects in a production end effector used to condition polishing pads, comprising:
   determining a range of natural frequencies of contact elements of a test end effector, wherein the contact elements of the test end effector are known good elements without significant defects; and
   comparing a natural frequency of a contact element of the production end effector to the range of natural frequencies of the contact elements of the test end effector to detect whether the production end effector contains a significant defect.

28. The method of claim 27 wherein determining the range of natural frequencies comprises:
   applying energy at a plurality of frequencies to at least a portion of the contact elements of the test end effector; and
   determining the frequency at which each contact element in the at least a portion of the contact elements of the test end effector resonates.

29. The method of claim 27 wherein determining the range of natural frequencies comprises applying energy at a plurality of frequencies between approximately 5 kHz and approximately 150 MHz to the contact elements of the test end effector.

30. The method of claim 27 wherein determining the range of natural frequencies comprises:
   moving a transducer over the test end effector; and
   applying ultrasonic energy from the transducer to at least a portion of the contact elements of the test end effector.

31. The method of claim 27 wherein comparing the natural frequency comprises determining if the natural frequency of the contact element of the production end effector falls within the range of natural frequencies to detect a significant defect in the contact element of the production end effector.

32. The method of claim 27 wherein comparing the natural frequency comprises determining if the natural frequency of the contact element of the production end effector falls within the range of natural frequencies to detect a significant defect in the attachment of the contact element to the production end effector.

33. The method of claim 27 wherein determining the range of natural frequencies comprises transmitting energy at a plurality of frequencies from a transducer to cause the contact elements of the test end effector to resonate.

34. A method of detecting defects in an end effector for conditioning polishing pads, comprising:
    determining a natural frequency of a first contact element of the end effector;
    determining a natural frequency of a second contact element of the end effector;
    comparing the natural frequency of the first contact element to the natural frequency of the second contact element to detect a significant defect.

35. The method of claim 34 wherein determining the natural frequency of the first contact element comprises transmitting energy at a first frequency from a transducer carried by the end effector to cause the first contact element to resonate.

36. The method of claim 34 wherein determining the natural frequency of the first contact element comprises:
    applying ultrasonic energy to the first contact element; and
    determining the frequency at which the first contact element resonates.

37. The method of claim 34 wherein determining the natural frequency of the first contact element comprises applying energy at a plurality of frequencies between approximately 5 kHz and approximately 150 MHz to cause the first contact element to resonate.

38. The method of claim 34 wherein determining the natural frequency of the first contact element comprises:
    moving a transducer over the end effector; and
    applying ultrasonic energy from the transducer to the first contact element to cause the first contact element to resonate.

39. The method of claim 34 wherein comparing the natural frequency of the first contact element to the natural frequency of the second contact element comprises determining if the difference between the natural frequency of the first contact element and the natural frequency of the second contact element is greater than a predetermined limit.

40. A method of testing for significant defects in an end effector used to condition polishing pads, comprising:
    transmitting ultrasonic energy toward a contact element of the end effector; and
    determining if the contact element includes a significant defect.

41. The method of claim 40 wherein determining if the contact element comprises:
    determining a natural frequency of the contact element; and
    comparing the natural frequency of the contact element to a predetermined frequency.

42. The method of claim 40 wherein transmitting ultrasonic energy to the contact element of the end effector comprises transmitting ultrasonic waves at a plurality of frequencies to cause the contact element to resonate.

43. The method of claim 40, further comprising:
    moving a transducer over the end effector; and
    wherein transmitting ultrasonic energy comprises directing ultrasonic waves from the transducer to the contact element.

44. A method of detecting defects in an end effector for conditioning polishing pads, comprising:
    moving a transducer over a plurality of contact elements on the end effector;
    directing ultrasonic waves toward a first portion of the plurality of contact elements; and
    determining if the first portion of the plurality of contact elements includes defects based on the reflection of the ultrasonic waves.

45. The method of claim 44 wherein:
    directing ultrasonic waves comprises resonating the first portion of the plurality of contact elements; and
    determining if the first portion of contact elements includes defects comprises:
        determining the natural frequencies of the contact elements in the first portion of the plurality of the contact element; and
        comparing the natural frequencies of the contact elements to a predetermined frequency.

46. The method of claim 44 wherein determining if the first portion of the plurality of contact elements includes defects comprises analyzing the reflection of the ultrasonic waves toward the transducer to determine if the contact elements in the first portion of the plurality of contact elements include significant defects.

47. The method of claim 44 wherein directing ultrasonic waves comprises transmitting ultrasonic waves at a plurality of frequencies to cause the contact elements in the first portion of contact elements to resonate.

48. A system for detecting defects in an end effector used for conditioning polishing pads, comprising:
    a conditioner including an end effector having a discrete area;
    a transducer for applying energy to the discrete area of the end effector; and
    a controller operatively coupled to the conditioner and the transducer, the controller having a computer-readable medium containing instructions to perform a method comprising
        applying energy to the discrete area of the end effector; and
        determining a natural frequency of the end effector at the discrete area.

49. The system of claim 48 wherein the transducer is configured to transmit energy with a first frequency between approximately 5 kHz and approximately 150 MHz to the discrete area.

50. The system of claim 48 wherein the transducer is configured to transmit ultrasonic energy at a plurality of frequencies to the discrete area.

51. The system of claim 48 wherein the transducer is movable over the end effector and configured to transmit energy to the discrete area to cause the end effector at the discrete area to resonate.

52. A system for detecting defects in an end effector used for conditioning polishing pads, comprising:
 a conditioner including an end effector having a contact element;
 a transducer for applying energy to the contact element; and
 a controller operatively coupled to the conditioner and the transducer, the controller having a computer-readable medium containing instructions to perform a method comprising
  resonating the contact element of the end effector at a natural frequency; and
  comparing the natural frequency of the contact element to a predetermined frequency to detect a defect.

53. The system of claim 52 wherein the transducer is configured to transmit energy with a first frequency between approximately 5 kHz and approximately 150 MHz to the contact element.

54. The system of claim 52 wherein the transducer is configured to transmit ultrasonic energy at a plurality of frequencies to the contact element.

55. The system of claim 52 wherein the transducer is movable over the end effector and configured to transmit ultrasonic energy to the contact element to cause the contact element to resonate.

56. A system for detecting defects in an end effector used for conditioning polishing pads, comprising:
 a conditioner including an end effector having at least one contact element;
 a transducer for applying energy to the at least one contact element; and
 a controller operatively coupled to the conditioner and the transducer, the controller having a computer-readable medium containing instructions to perform a method comprising
  positioning the transducer at least proximate to the at least one contact element;
  applying energy at a first frequency to the at least one contact element; and
  applying energy at a second frequency different from the first frequency to the at least one contact element.

57. The system of claim 56 wherein the first frequency and the second frequency are between approximately 5 kHz and approximately 150 MHz, and wherein the first frequency or the second frequency corresponds to a natural frequency of the at least one contact element.

58. The system of claim 56 wherein the transducer is configured to sweep a range of frequencies between the first frequency and the second frequency while applying energy to the at least one contact element.

59. A system for detecting defects in a production end effector used for conditioning polishing pads, comprising:
 a production end effector having a contact element;
 a transducer for applying energy to the contact element of the production end effector; and
 a controller operatively coupled to the end effector and the transducer, the controller having a computer-readable medium containing instructions to perform a method comprising
  determining a natural frequency of the contact element of the production end effector; and
  comparing the natural frequency of the contact element of the production end effector to a range of natural frequencies of contact elements of a test end effector to detect a significant defect in the production end effector.

60. The system of claim 59 wherein the transducer is configured to transmit energy at a first frequency between approximately 5 kHz and approximately 150 MHz to the contact element of the production end effector to determine the natural frequency of the contact element of the production end effector.

61. The system of claim 59 wherein the transducer is carried by the end effector and configured to transmit ultrasonic energy to the contact element of the production end effector to determine the natural frequency of the contact element of the production end effector.

62. The system of claim 59 wherein the transducer is movable over the end effector and configured to transmit ultrasonic energy to the contact element of the production end effector to cause the contact element of the production end effector to resonate.

63. A system for detecting defects in an end effector used for conditioning polishing pads, comprising:
 a conditioner including an end effector having a first contact element and a second contact element;
 a transducer for applying energy to the first and second contact elements; and
 a controller operatively coupled to the conditioner and the transducer, the controller having a computer-readable medium containing instructions to perform a method comprising
  determining a natural frequency of the first contact element;
  determining a natural frequency of the second contact element; and
  comparing the natural frequency of the first contact element to the natural frequency of the second contact element to detect a significant defect.

64. The system of claim 63 wherein the transducer is configured to transmit energy with a first frequency between approximately 5 kHz and approximately 150 MHz to the first contact element to determine the natural frequency of the first contact element.

65. The system of claim 63 wherein the transducer is carried by the end effector and configured to transmit ultrasonic energy at a plurality of frequencies to the first contact element and the second contact element to determine the natural frequency of the first contact element and the natural frequency of the second contact element.

66. The system of claim 63 wherein the transducer is movable over the end effector and configured to transmit ultrasonic energy to the first contact element to cause the first contact element to resonate at the natural frequency of the first contact element.

67. A system for detecting defects in an end effector used for conditioning polishing pads, comprising:
 a conditioner including an end effector having a contact element;
 a transducer for applying ultrasonic energy to the contact element; and
 a controller operatively coupled to the conditioner and the transducer, the controller having a computer-readable medium containing instructions to perform a method comprising
  transmitting ultrasonic energy toward the contact element of the end effector; and
  determining if the contact element includes a significant defect.

68. The system of claim 67 wherein the transducer is configured to transmit ultrasonic waves toward the contact element and receive a reflection of the ultrasonic waves.

69. The system of claim 67 wherein the transducer is configured to direct ultrasonic energy with a first frequency between approximately 5 kHz and approximately 150 MHz to the contact element to determine the natural frequency of the contact element to determine if the contact element includes the significant defect.

70. The system of claim 67 wherein the transducer is movable over the end effector and configured to apply ultrasonic energy to the contact element to cause the contact element to resonate at a natural frequency.

71. A system for detecting defects in an end effector used for conditioning polishing pads, comprising:

a conditioner including an end effector having a plurality of contact elements;

a transducer for producing ultrasonic waves; and a controller operatively coupled to the conditioner and the transducer, the controller having a computer-readable medium containing instructions to perform a method comprising moving the transducer over the plurality of contact elements on the end effector;

directing ultrasonic waves toward a first portion of the plurality of contact elements; and determining if the first portion of the plurality of contact elements includes defects based on the reflection of the ultrasonic waves.

72. The system of claim 71 wherein the transducer is configured to transmit ultrasonic waves toward the first portion of the plurality of contact elements and receive the reflection of the ultrasonic waves.

73. The system of claim 71 wherein the transducer is movable over the end effector and configured to transmit ultrasonic waves to the first portion of the plurality of contact elements to cause the first portion of the plurality of contact elements to resonate at their natural frequencies.

* * * * *

UNITED STATES PATENT AND TRADEMARK OFFICE
CERTIFICATE OF CORRECTION

PATENT NO. : 6,918,301 B2
DATED : July 19, 2005
INVENTOR(S) : Jason B. Elledge

It is certified that error appears in the above-identified patent and that said Letters Patent is hereby corrected as shown below:

Column 9,
Line 9, "etfector" should be -- effector --;

Column 11,
Line 22, insert -- and -- after "effector;".

Signed and Sealed this

Twenty-eighth Day of February, 2006

JON W. DUDAS
*Director of the United States Patent and Trademark Office*